United States Patent [19]

Petroczky

[11] 3,944,260
[45] Mar. 16, 1976

[54] PIPE REPAIR FITTINGS

[76] Inventor: Frank G. Petroczky, 416 N. Maple Ave., Oak Park, Ill. 60302

[22] Filed: Jan. 8, 1975

[21] Appl. No.: 539,348

[52] U.S. Cl. .................. 285/15; 285/156; 285/179; 285/351; 285/373; 285/423; 138/99
[51] Int. Cl.² .......................................... F16L 55/18
[58] Field of Search ............ 285/15, 423, 373, 419, 285/351, 369, 156, 179; 138/97, 99

[56] References Cited
UNITED STATES PATENTS

| | | | |
|---|---|---|---|
| 2,899,984 | 8/1959 | Goffin | 138/99 |
| 2,958,546 | 11/1960 | Lee | 285/373 X |
| 3,082,022 | 3/1963 | Moore | 285/423 X |
| 3,151,631 | 10/1964 | Yono | 285/373 X |
| 3,396,753 | 8/1968 | Foster et al. | 138/99 |
| 3,517,701 | 6/1970 | Smith | 285/15 X |

Primary Examiner—Dave W. Arola

[57] ABSTRACT

Repair fittings are provided sealing ruptures or leaks in existing piping systems. The fittings are economical to produce and can be simply installed to provide effective and reliable leak protection. The fittings are of the gasket type and include a pair of substantially identical housing halves which can be fixedly attached to enclose a piping coupling and sections of the accompanying piping. The gaskets are positioned in grooves formed in the surface of each housing half. In assembly, the gaskets compressively mate to provide a fluid tight seal between the two halves with multiple fluid tight seals being formed around the pipe sections encompassed by the fitting.

6 Claims, 4 Drawing Figures

U.S. Patent   March 16, 1976   3,944,260
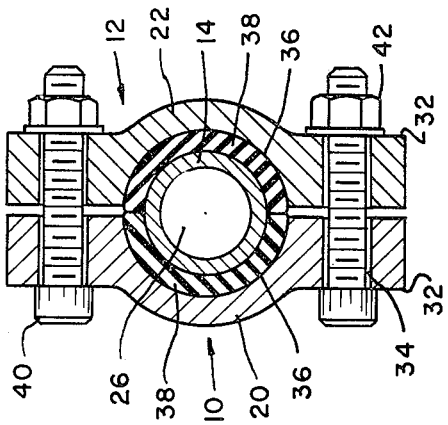
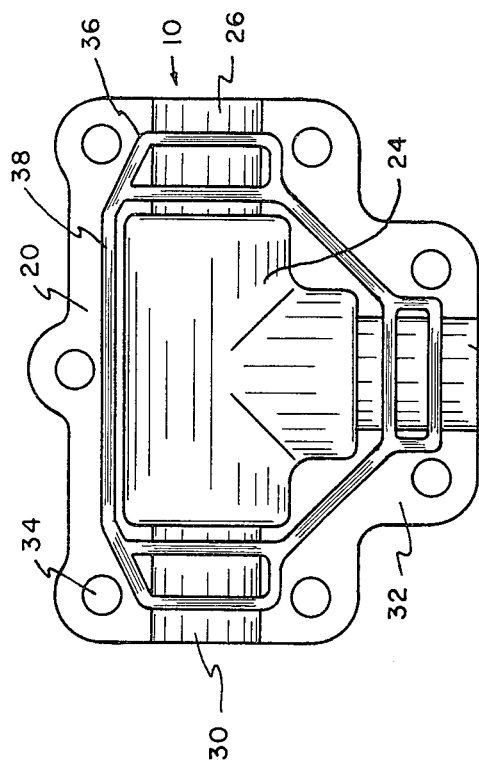
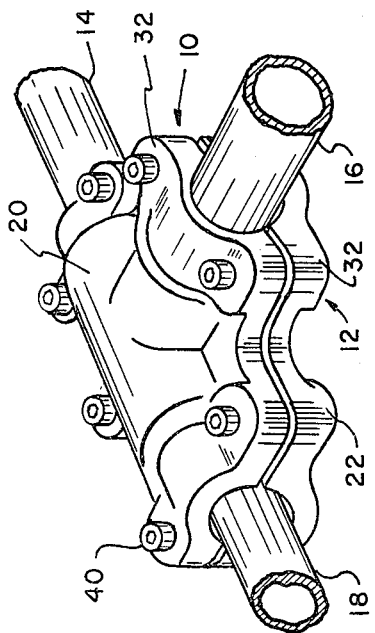
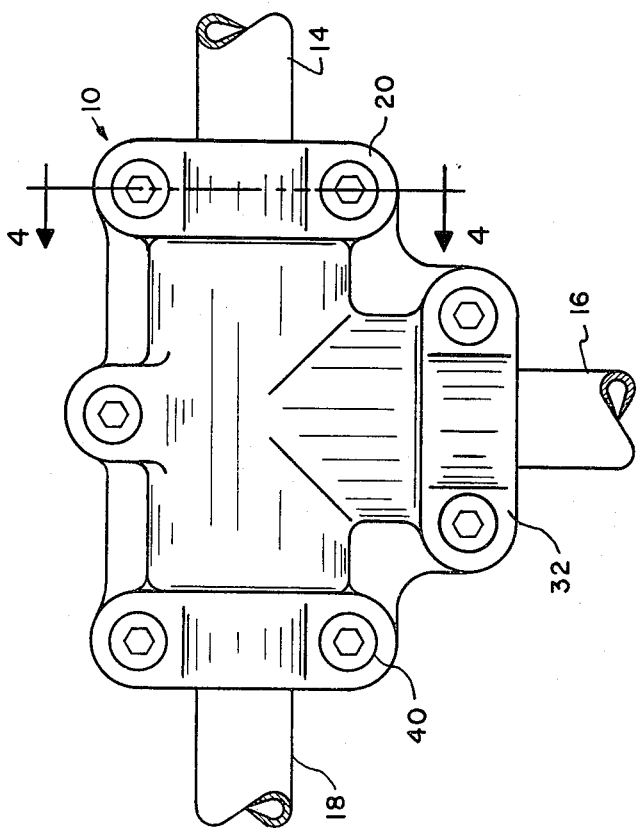

PIPE REPAIR FITTINGS

BACKGROUND OF THE INVENTION

This invention relates to pipe repair fittings designed for pipes through which liquid passes under pressure. More particularly, the repair fittings of this invention are adapted for simple installation in existing piping systems to effectively surround and seal ruptures or leaks which have developed in the piping system at coupling or pipe joinder positions.

The repair or ruptures or leaks in existing piping systems has presented a long standing and continuing problem in the art. Numerous types of fittings have been proposed with the intent of providing a device to be installed around a rupture or leak to repair the leak without requiring disassembly of the existing system and subsequent reassembly of the system with replacement parts installed. It will be recognized that such disassembly and reassembly activities are time consuming and costly in terms of labor and parts. Also such repair activities are inconvenient since the system must be shut down while the repair is in process. However, the fittings previously proposed have not been completely satisfactory from the standpoint of providing effective and reliable closing and sealing of the rupture or leak at the pipe coupling or joinder positions with devices which can be produced at commercially acceptable cost.

Repair fittings which have been proposed and which can be economically produced are those which employ strips of gasket material to seal the pipes on opposite sides of the rupture or leak. Exemplary of such fittings are the pipe joint protectors disclosed in U.S. Pat. No. 320,771. These fittings, however, have presented problems in effectiveness of sealing leaks because of the criticality of proper alignment of the single gasket arrangements which have been proposed. If the unitary end gasket fails for some reason such as improper alignment of the gaskets or the use worn gaskets, there is no secondary seal to prevent leakage. In an attempt to overcome this problem other fittings have been proposed which utilize complete elastomeric sleeves bonded to metal shell bodies and the bodies are compressively connected so that the seal members are joined to form a fluid tight seal. Such arrangements are effective for sealing leaks but are unadvantageously costly to produce. An example of this latter form of repair fitting is disclosed in United States Letters Patent 3,517,701.

SUMMARY OF THE INVENTION

It is, therefore, a principal object of the present invention to provide repair fittings of the type utilizing gasket leak protection so as to be economically practical and, yet, provide effective and reliable leak prevention in piping systems for liquids carried under pressure.

Another object is to provide gasket type repair fittings which may be fabricated of plastic or metal and which have secondary sealing means for insuring that a leak at the pipe coupling will be totally enclosed.

To effect these and other objects, features and advantages of the invention, a repair fitting is provided which includes two coupling housing halves attachable together about a pipe and its coupling to enclose a rupture or leak therein. The two coupling housing halves may be fabricated from any suitable material such as an appropriate metal but preferably a plastic material is employed. Continuous grooves are formed in the face of each of the halves in a manner such that a continuous gasket of suitable elastomeric material such as rubber can be fixedly held within the groove. Each housing half also includes a central cavity adapted to accommodate a pipe coupling such as an elbow, a straight coupling, a T coupling or any other desired coupling arrangement. Passageways are also formed in the housings to provide access to the central cavity for the pipes which are connected to the pipe coupling situated in the cavity. The number of passageways provided will depend on the specific type of coupling employed (i.e., two passageways for an elbow or straight coupling and three passageways for a T).

The continuous grooves are substantially identically aligned in each housing half to insure that the required mating of the gaskets positioned therein will be achieved when the two halves are joined or coupled about the pipe coupling and pipes. The grooves are positioned in each face in a manner such that the continuous groove totally surrounds the perimeter of the cavity formed in the face with multiple grooves being formed across the passageways. As a result of the provision of a plurality of grooves across each of the passageways, it has been found that when the elastomeric gaskets are inserted into the grooves and the two coupling housing halves are joined together compressively,, the functionality of the herein proposed repair fittings is substantially improved. That is, a more reliable and effective seal is provided to eliminate leaking and, if a leak is encountered for some reason such as misalignment or wear of one set of gaskets, the other gasket seals will maintain the fluid tight seal.

BRIEF DESCRIPTION OF THE DRAWINGS

FIG. 1 is a perspective view of a repair fitting of the present invention installed around a T pipe coupling to repair a leak in the coupling;

FIG. 2 is a top plan view of the repair fitting illustrated in FIG. 1;

FIG. 3 is a side elevational view of a fitting half, in condition for joinder with another substantially identical fitting half to form the repair fitting illustrated in FIGS. 1 and 2, the illustrated fitting half having a gasket installed in the grooves formed in the coupling housing around the central cavity and across the passageways; and FIG. 4 is a cross sectional view taken along line 4-4 of FIG. 2.

DETAILED DESCRIPTION OF THE DRAWINGS

Referring to the drawings, a repair fitting is illustrated including two coupling housing halves 10 and 12. The fitting is installed around a standard T pipe coupling (not shown) which has three pipes 14, 16 and 18 threadedly connected thereto. The fitting is normally formed to fit over a T or elbow pipe coupling since leaks tend to occur at the joint of the pipe coupling due to stress concentrations and the like. However, a repair fitting for use over a straight coupling can also be used to repair a leak in a straight piece of pipe intermediate its ends.

The two housing halves 10 and 12 are substantially identical in configuration and include rigid body members 20 and 22, respectively, fabricated from any suiable material such as a plastic or metallic material and may be formed by any suitable process such as molding, stamping, casting and the like. As best illustrated in FIG. 3, the body member 20 is formed with a central cavity or recess 24 with three separate semicircular access passageways 26, 28 and 30 extending therefrom to accept the pipes 14, 16 and 18, respectively. The cavity 24 is proportioned to accept the T pipe coupling in cradling relationship. Flange 32 extends outwardly from the cavity 24 and passageways 26, 28 and 30 and defines the periphery of the body member 20. Bolt holes 34 are formed in the flange 32. For purposes of discussion, the components of body member 22 which are substantially identical to components of body 20 illustrated in FIG. 3 will be referred to hereinafter by the same reference numerals as those applied to the components of the illustrated body member 20.

On the interior face of each body member 20 and 22, substantially identical continuous grooves 36 are formed in the flanges 32. As best illustrated in FIG. 3, the continuous grooves 36 traverse the body member face adjacent the perimeter of the cavity 24 and extend transversely across the surface within the cavity of the semicircular access passageways 26, 28 and 30. The grooves 36, as illustrated, are bifurcated adjacent each of the passageways 26, 28 and 30 in a manner such that the grooves 36 cross the passageway surfaces at two positions providing primary and secondary sealing capability. It will be recognized that additional transverse grooves may be formed in the surface of the passageways to provide additional sealing capability if desired.

Elastomeric gasket means 38 are press fitted into the grooves 36 of the body members 20 and 22 to fixedly attach the gaskets 3 within the grooves 36. If desired, the gaskets may be bonded by any suitable means to the surface of the grooves to assure that the gasket will be retained in proper position. Preferably, the gaskets 38 will be unitary, continuous preformed bodies specially adapted to be press fitted into the grooves. However, it is possible to utilize a single continuous band of elastomeric material for this purpose or to utilize abutting strips of elastomeric material for the gaskets 38. The gaskets 38 must be formed of an elastomer having sufficient diameter so as to extend outside of the groove in order to provide a sealing contact surface between the gaskets when the coupling housing halves 10 and 12 are compression connected.

In assembly, the housing halves 10 and 12 are positioned on opposite sides of the pipes and pipe coupling with the pipe coupling cradled within the cavities 24 in the respective body members 20 and 22 and the pipes 14, 16 and 18 cradled in the passageways 26, 28 and 30, respectively. Bolts 40 are inserted into each of the bolt holes 34 and tightened with nuts 42 to compressively connect the two halves together. Alternatively, tapped bolt holes may be provided in one of the halves so that the bolts may be inserted through bolt holes in one half and threaded directly into the other half, thus eliminating the necessity for the nuts 42.

When assembled, the positioned gaskets 38 in grooves 36 of body members 20 and 22 compressively mate to provide a fluid tight sealing compartment around the pipe coupling nested within cavity 24. Furthermore, the plural sections of each of the gaskets 36 which are compressively mated transversely across the surface of the pipes 14, 16 and 18 provide a multisealing arrangement so that if one of the transverse gasket seals should fail, the leak will still be enclosed and the repair fitting will still be effective because of the presence of the secondary gasket seal provided by the remaining compressively mated section of gaskets 36 which also are positioned transversely across and around the pipes.

Thus, a simple, easily installed and reliable repair fitting is provided which can easily be installed around a leak even while the system remains under pressure. There is no difficulty in locating the parts of the assembly during compression connection so a permanent and dependable repair is easily accomplished. Since the sealing material in each fitting half completely encloses the area of the leak, there is no danger of the leaking fluid penetrating behind the sealing material and a dependable rubber-to-rubber joint is afforded to seal the two coupling halves. Preferably the cavities within the coupling halves are proportioned so that the pipe coupling is received in the cavity with clearance so that the pipe coupling will not interfere with the proper connection of the two halves along the flange areas.

While there has been described what is at present considered to be the preferred embodiment of the invention, it is to be understood that modifications may be made therein, and it is intended that the appended claims cover all such modifications which fall within the true spirit and scope of the invention.

I claim:

1. A fitting for repair of leaking pipe couplings comprising a pair of substantially identical coupling housing halves, the interior surface of each half including a centrally positioned cavity, a plurality of recessed paths extending from said cavity to the periphery of said housing and an uninterrupted, continuous groove formed in said surface surrounding the perimeter of said cavity and extending transversely across each of said paths at a plurality of positions longitudinal of said paths, said housing halves being adapted for aligned fixed attachment around a pipe coupling and a section of each of the pipes attached thereto with said coupling being positioned within a chamber formed by said cavities in said halves and said pipes being positioned within passageways formed by said paths in said halves, a continuous elastomeric gasket means positioned within a continuous passage formed by said grooves in said halves, said gasket means in said passage forming an uninterrupted, continuous fluid tight seal surrounding said chamber and crossing said passageways at a plurality of positions longitudinal thereof when said halves are fixedly attached whereby a leak at said coupling is surrounded and said leak is enclosed by said fluid tight seal.

2. The fitting of claim 1 wherein said groove in each of said housing halves is bifurcated adjacent each of said recessed paths forming two grooved notches across each of said paths with said elastomeric gasket means positioned therein providing a double fluid tight seal around each of said pipes in said passageways when said halves are attached whereby said uninterrupted, continuous fluid seal includes primary and secondary seals in each passageway for enclosing said leak.

3. The fitting of claim 1 wherein said housing halves are fabricated of plastic.

4. The fitting of claim 1 wherein said elastomeric gaskets are fabricated of rubber.

5. The fitting of claim 1 wherein said pipe coupling is selected from the group consisting of straight couplings, elbow couplings and T couplings.

6. The fitting of claim 1 including a pipe coupling positioned within said chamber with pipes attached thereto and extending through said passageways.

* * * * *